C. B. MORSE.
MACHINE FOR CUTTING SASH AND OTHER MOLDINGS.
No. 12,248.                    Patented Jan. 16, 1855.
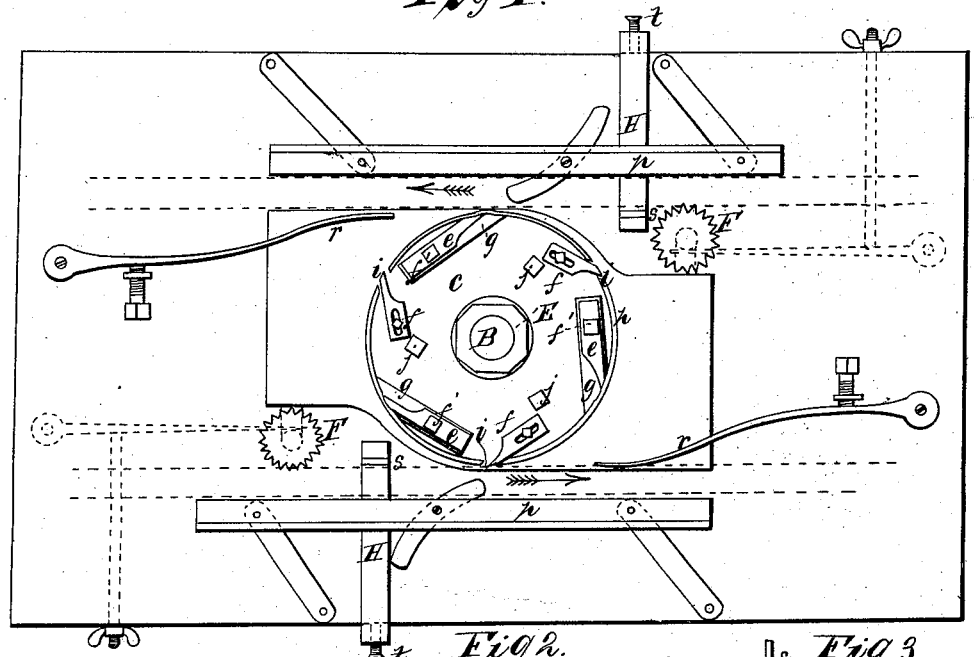
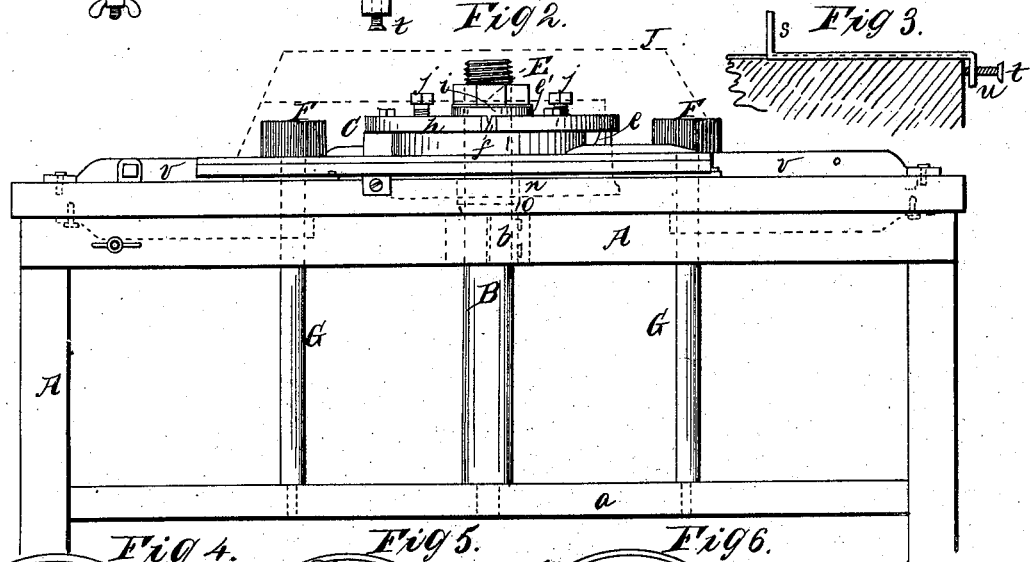
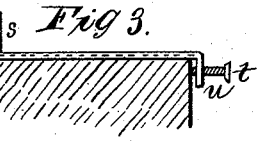
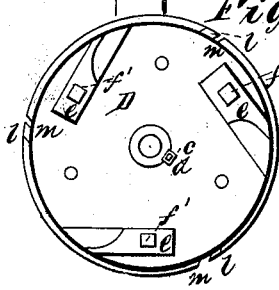
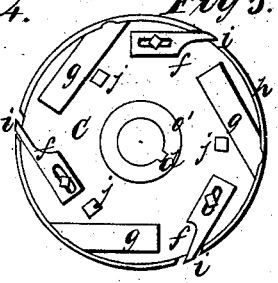
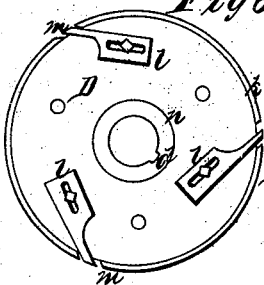
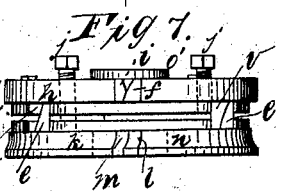

UNITED STATES PATENT OFFICE.

C. B. MORSE, OF RHINEBECK, NEW YORK.

MOLDING-MACHINE.

Specification of Letters Patent No. 12,248, dated January 16, 1855.

*To all whom it may concern:*

Be it known that I, C. B. MORSE, of Rhinebeck, in the county of Dutchess and State of New York, have made certain new and useful Improvements in Machines for Cutting Sash and other Moldings; and I do hereby declare that the following is a full, clear, and exact description of the construction and operation of the same, reference being had to the annexed drawings, making a part of this specification, in which—

Figure 1 is a plan or bird's-eye view of the machine, the cap being removed. Fig. 2 is a side elevation of ditto, the cap being placed over the cutter stock and shown by dotted lines. Fig. 3 is a section showing one of the bars or shields. Fig. 4 is a plan view of the upper surface of the lower disk of the cutter stock. Fig. 5 is a plan view of the upper disk of the cutter stock. Fig. 6 is an inverted plan, or a view of the undersurface of the lower disk of the cutter stock. Fig. 7 is a side view of the cutter stock showing both disks.

Similar letters of reference indicate corresponding parts in each of the several figures.

The object of the first part of my invention, is to enable my machine to operate on stuff passing simultaneously in parallel paths, and in opposite directions, on different sides of the rotary cutter head; or, in effect so to construct the cutter head, that the same cutters may act twice during its revolution. The great difficulty in effecting this object has arisen from the inability of rotary cutters to relieve themselves of the shavings with sufficient rapidity to admit of their acting twice in one revolution; from the fact that as the shavings are discharged outward they have a tendency to adhere to the edges of the cutter for a considerable portion of the revolution after the cut is made, before they are finally thrown off. So that if an attempt was made to give cutters on a head of ordinary construction, a double action as I design, the shaving or chip would adhere to the edge of the cutter and be brought in contact with the second piece of stuff, thus clogging the machine and rendering it inoperative.

To effect the above mentioned object I so construct the cutter head, that while it is made adjustable for the production of different widths of moldings, there will by its rotation be a partial vacuum created in its interior, and an inward draft thus formed past the edges of the cutters, sufficient to carry the shavings as soon as made to the interior of the cutter head, and thence discharged from the machine, so that the edges of the cutters are instantly freed, and no hindrance opposed to their operating twice in a single revolution of the cutter head. The construction of cutter head which admits of these results and in which this part of my invention consists, lies of forming it of flanged disks as will be described, with openings in one disk for the passage of the middle series of cutters, so that a portion of their edges may be masked if desired, and at the same time forming a communication between the outside of the perforated disk and the space between the sections of the head; this construction in combination with other parts as will be described serving to effect the end in view.

Another portion of my invention consists in the employment of adjustable shields as will be described, in combination with the feed rollers, for preventing the said rollers from lifting the stuff against the cutters, when if the feed be not continuous the roller passes over the end of the piece, thus preventing the cutting and marring of the stuff by the cutters, which would take place by reason of said action of the rollers if there be an interruption in the feed.

To enable others skilled in the art to make and use my invention, I will proceed to describe its construction and operation.

A, Fig. 2, represents the frame of the machine, the frame may be constructed of any proper material and be of any desirable form.

B, is a shaft placed vertical in the machine, its lower end bearing on the cross piece (*a*) of the frame A as seen in Fig. 2. The shaft also has a bearing (*b*) in a transverse cross piece on the upper part of the frame see dotted lines in Fig. 2.

C, D, Fig. 7, are two circular disks or plates constructed of metal and each having a circular opening through its center through which the shaft B passes a ledge or projection (*c*) Fig. 4, on the shaft fitting in a recess (*d*) Figs. 5 and 6 on the side of the opening, by this means the disks or plates are caused to rotate with the shaft B.

In Fig. 4 a view of the upper surface of the lower disks D, is seen; on this upper surface are placed three cutters (*e*) (*e*) (*e*)

secured by screws (*f'*). The cutters (*e*) (*e*) (*e*) are center cutters or are about in the center of the stock, see Fig. 7. In Fig. 5 a view of the upper surface of the upper disk C is seen, there are also three cutters (*f*) (*f*) (*f*) secured to this disk by screws, and there are three slots (*g*) (*g*) (*g*) cut through it to allow the cutters (*e*) (*e*) (*e*) on the lower disk to set in when the upper disk C is placed over the lower disk D. The cutters (*f*) (*f*) (*f*) on the upper disk cut the recess in sash mouldings in which the lights of glass set.

The upper disk C has a rim (*h*) projecting upward around its edge and the cutting edges of the cutters project through recesses (*i*) in the rim, see Fig. 5, (*j*) (*j*) (*j*) are set screws which pass through the upper disk C the lower ends of the set screws bearing against the upper surface of the lower disk D, it is by this means that the disks are placed the requisite distance apart. In Fig. 6, a view of the under surface of the lower disk D, is seen; there are three cutters (*l*) (*l*) (*l*) attached to this underside which cut the bead; there is also a rim (*k*) on the lower disk which projects downward from the disk and the cutting edges of the cutters (*l*) (*l*) (*l*) project through recesses (*m*) in the rim. Thus it will be seen that there are three sets of cutters, two sets on the lower disk D, and one set on the upper disk C, the lower set of cutters or the cutters (*l*) (*l*) (*l*) on the under side of the lower disk D, cut the bead; the cutters (*e*) (*e*) (*e*) cut the space between the bead and the recess, which the cutters (*f*) (*f*) (*f*) cut the recess that is in speaking of sash moldings. The lower disk D is placed on the vertical shaft B, a collar (*n*) projecting downward from the under surface of the disk resting on the shoulder (*o*) on the shaft B, see dotted lines in Fig. 2. The upper disk C is then placed on the shaft directly over the lower disk, D, and if narrow moldings are to be cut the under surface of the upper disk rests upon the upper surface of the lower disk, the cutters (*e*) (*e*) (*e*) fitting in the slots (*g*) (*g*) (*g*) as before mentioned. The upper disk C is secured or pressed firmly against the lower disk D, by the nut E, which works on the top of the shaft B, and bears when screwed down against the collar (*o'*) on the upper surface of the upper disk C. If wider moldings are to be cut the upper disk is raised from the lower disk by properly adjusting the set screws (*j*) (*j*) (*j*) the lower ends of the set screws bearing against the upper surface of the lower disk D, see dotted lines in Fig. 7.

It must be understood that the cutters (*e*) (*e*) (*e*) which are the center cutters must be of sufficient width to cut over the space between the cutters (*l*) (*l*) (*l*) in other words the cutters (*e*) (*e*) (*e*) must be of sufficient width to allow the two disks to be placed as wide a distance apart as may be desired.

F, F, are two feed rollers corrugated and placed at the top of two vertical shafts G, G, the feed rollers like the two disks forming the cutter stock, are so arranged that their under surfaces are even with the top surface of the platform on the frame; the "stuff" to be cut being placed on the platform and fed along by the feed rollers between the cutter stock and a gage (*p*).

The feed rollers and gager required no particular description as they are common to most molding machines and well known devices as also are the springs (*r*) (*r*) which serve as guides to the "stuff" while passing between gages and cutter blocks.

H H are bars fitting in grooves cut in the platform, at right angles to the guides *p*, on each of which is a projecting ledge or shield (*s*). The object of these shields is to prevent the feed rollers F from lifting the end of the "stuff" and throwing it against the cutters, in case of a break in the continuity of the feed; as in that case the teeth of the roller will when the end of the stuff is reached, seize on the end, lift from the guide, and carry it against the cutters, with the effect of seriously injuring the piece. The interposition of the shield (*s*) to thus receive the stuff, when thus acted on by the roller, effectually prevents the marring of the piece from an interruption in the feed; that being the only case where it is designed to be brought in service, as when the pieces of stuff follow each other end to end no such action of the feed rollers can obtain: these shields being merely intended to prevent injury to the stuff in the case above set forth.

The shields are set the required distance by the set screws (*t*) (*t*) which bear against the edge of the platform, the set screws passing through a ledge (*u*) projecting downward at the outer ends of the bars as seen in Fig. 3.

I use the term "stuff" for the stock or wood, which is to be cut, a term commonly employed by mechanics.

It will be seen by referring to Fig. 1 that the cutter block or more properly the cutters act upon two pieces of "stuff" at the same time, the red lines indicate the "stuff" the stuff is cut the required form on one side only at a time and must be passed again along the side of the cutter block to have the opposite side cut. In this machine a molding is cut at one operation, as the "stuff" is passed along by the cutter block at one side of the machine and passed back again by the cutter block on the opposite side see arrows.

The cutter block is covered by a cap J, see dotted lines in Fig. 2, which prevents the shavings from being scattered about the room, there are two recesses through the cap to allow the shavings to pass out and fall upon the floor directly under the machine. It will be understood that the shavings pass in through the recesses (*m*) (*i*) in the rims (*h*) (*k*) and through the recesses (*v*) in the disk C, below the rim (*h*) (see Fig. 7) for the reason that a partial vacuum is formed in the interior of the cutter head, by reason of its rapid rotation, and that as the air rushes in to fill it through the above named openings, a current is formed passing inward over the edges of the cutters, and upward through the slots (*g*), carrying with it the shavings and chips as soon as made, and permitting the double action of the cutters as above described.

The advantages of this machine over others for a like purpose are first any sized moldings may be cut by adjusting the two disks forming the cutter stock; this may be done in a moment of time and is of great importance, it saves the expense of having on hand a variety of stocks which would otherwise be required. Moreover the double action of the cutters, will in the case of sash moldings, insure the similarity of the two sides, as they are both formed with the cutters in the same condition. This result is not attainable where a lot of stuff is first finished on one side, and after the cutters have been worn down, or resharpened, passed through and finished on the other side. Independently of these considerations the double action is a saving of labor. Second. The employment of the adjustable shields in combination with the feed rollers, protects the stuff from injury in event of a break in the continuity of the feed, a circumstance likely to occur with one man feeding in both directions on opposite sides of the platform.

Having thus described my invention and its operation, I disclaim constructing a cylindrical rotating cutter head, with a separating joint athwart its middle, as such is not new.

What I do claim as my invention and desire to secure by Letters Patent, is—

1. Constructing the cutter head of two flanged disks, with slots or openings *g* through one of the disks to admit of cutters *e* being attached to the other part and partially marked by the flange of the perforated disk, as described, in combination with cutters *f* and *l* in openings through the rims or flanges, and secured respectively to each disk, so as to present a cutting edge over the whole space, caused by the opening or closing of said disks, by means of nut E and set screws *j*: said combination favoring a current inward from the edges of the cutters to fill the partial vacuum formed in the interior of the head by the rotation of the same; thereby causing a speedy inward removal of the shavings from the cutters, and admitting of the double action of the same as before set forth.

2. The adjustable shields (*s*) in combination with the feed rollers F, for preventing the said rollers from lifting the piece operated upon against the cutters, when the feed is not continuous and the extremity of the piece reaches the roller, as herein before set forth.

C. B. MORSE.

Witnesses:
HARVEY M. TRAVER,
TIMOTHY HORAN.